United States Patent
Bernhardsson et al.

(10) Patent No.: US 7,302,276 B2
(45) Date of Patent: Nov. 27, 2007

(54) METHOD AND SYSTEM FOR DETERMINING UPLINK/DOWNLINK PATH-LOSS DIFFERENCE

(75) Inventors: Bo Bernhardsson, Lund (SE); Jonas Ohlsson, Malmö (SE); Mikael Zirèn, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 587 days.

(21) Appl. No.: 10/926,742

(22) Filed: Aug. 26, 2004

(65) Prior Publication Data

US 2005/0143118 A1    Jun. 30, 2005

Related U.S. Application Data

(60) Provisional application No. 60/524,650, filed on Nov. 25, 2003.

(51) Int. Cl.
*H04B 7/00*  (2006.01)
*H04Q 7/20*  (2006.01)

(52) U.S. Cl. .................. 455/522; 455/69; 455/436; 455/67.11; 455/226.1; 455/226.2; 455/226.3

(58) Field of Classification Search .......... 455/522, 455/69, 88, 438, 436, 422.1, 70, 67.11, 127.2, 455/127.3, 456.5, 226.1–226.3
See application file for complete search history.

(56) References Cited

U.S. PATENT DOCUMENTS

| | | | |
|---|---|---|---|
| 6,094,576 A | * | 7/2000 | Hakkinen et al. ........ 455/422.1 |
| 6,167,240 A | | 12/2000 | Carlsson et al. |
| 6,175,745 B1 | | 1/2001 | Bringby et al. |
| 6,535,547 B1 | | 3/2003 | Lyckegård et al. |
| 6,549,564 B1 | | 4/2003 | Popovic |

(Continued)

FOREIGN PATENT DOCUMENTS

EP    1176739 A1    1/2002

(Continued)

OTHER PUBLICATIONS

PCT International Search Report dated Mar. 9, 2005 in connection with International Application No. PCT/EP2004/013170.

(Continued)

*Primary Examiner*—Matthew Anderson
*Assistant Examiner*—Sujatha Sharma
(74) *Attorney, Agent, or Firm*—Potomac Patent Group PLLC

(57) ABSTRACT

Methods and apparatus are described for estimating a path-loss difference between uplink and downlink communications at a first node communicating with a second node in a communication system. A quantity of access request preambles transmitted by the first node to the second node before an acknowledgement from the second node of successful receipt of a preamble is received at the first node is determined. A difference between an uplink path-loss attributed to communications from the first node to the second node and a downlink path-loss attributed to communications to the first node from the second node is estimated based on the transmitted preamble quantity determination. Once the path-loss difference is estimated, the estimate can be used for many purposes, such as to determine a transmission power of the first node.

40 Claims, 7 Drawing Sheets

U.S. PATENT DOCUMENTS

| | | |
|---|---|---|
| 6,606,313 B1 | 8/2003 | Dahlman et al. |
| 6,628,956 B2 * | 9/2003 | Bark et al. .................. 455/522 |
| 6,993,063 B2 * | 1/2006 | Zeira et al. ................. 375/130 |
| 7,076,262 B1 * | 7/2006 | Bhatoolaul et al. ......... 455/522 |
| 7,174,183 B2 * | 2/2007 | Moulsley et al. ........... 455/522 |
| 7,212,823 B2 * | 5/2007 | Granzow et al. ........... 455/450 |
| 2002/0159395 A1 | 10/2002 | Nelson, Jr. et al. |
| 2003/0060224 A1 | 3/2003 | Nelson, Jr. et al. |
| 2004/0008658 A1 | 1/2004 | Dahlman et al. |

FOREIGN PATENT DOCUMENTS

| | | |
|---|---|---|
| WO | WO 99/07105 A | 2/1999 |
| WO | WO 01/78252 A1 | 10/2001 |

OTHER PUBLICATIONS

PCT Written Opinion dated Mar. 9, 2005 in connection with International Application No. PCT/EP2004/013170.

"Improved OLPC for FACH", TSG-RAN WG1 meeting #18, Boston Massachusetts, Jan. 15-18, 2001, Golden Bridge Technology, AH28.

"Operation of the Uplink Shared Channel", TSG-RAN Working Group meeting#2, Yokohama, Feb. 22-25, 1999, Item 11, Motorola.

Moberg, J. et al.: "Throughput of the WCDMA Random Access Channel", IST Mobile Communications Summit, Galway, Ireland, Oct. 1-4, 2000.

3$^{rd}$ Generation Partnership Project; Technical Specification Group Radio Access Network; Physical layer procedures (FDD) (Release 5), 3$^{rd}$ Generation Partnership Project, Technical Specification 25.214 V5.6.0, Sep. 2003.

3$^{rd}$ Generation Partnership Project; Technical Specification Group Radio Access Network; Physical channels and mapping of transport channels onto physical channels (FDD) (Release 5), 3$^{rd}$ Generation Partnership Project, Technical Specification 25.211 V5.2.0, Sep. 2002.

* cited by examiner

METHOD AND SYSTEM FOR DETERMINING UPLINK/DOWNLINK PATH-LOSS DIFFERENCE

CROSS-REFERENCE TO RELATED APPLICATIONS

This application claims the benefit of U.S. Provisional Application No. 60/524,650 entitled "Estimator of Path Loss Difference between Uplink and Downlink" filed on Nov. 25, 2003, the disclosure of which is incorporated by reference.

BACKGROUND

The invention relates to communication systems. More particularly, the invention relates to estimating a path-loss in a communication system.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and WCDMA telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focuses on WCDMA systems for simplicity, but it will be understood that the principles described in this application can be implemented in other digital communication systems.

WCDMA is based on direct-sequence spread-spectrum techniques. Two different codes are used for separating base stations and physical channels in the downlink (base-to-terminal) direction. Scrambling codes are pseudo-noise (pn) sequences that are mainly used for separating the base stations or cells from each other. Channelization codes are orthogonal sequences that are used for separating different physical channels (terminals or users) in each cell or under each scrambling code. Since all users share the same radio resource in CDMA systems, it is important that each physical channel does not use more power than necessary. This is achieved by a transmit power control mechanism in which the terminal estimates the signal-to-interference ratio (SIR) for its dedicated physical channel (DPCH), compares the estimated SIR against a reference value, and informs the base station to adjust the base station's transmitted DPCH power to an appropriate level. WCDMA terminology is used here, but it will be appreciated that other systems have corresponding terminology.

FIG. 1 depicts a communication system, such as a WCDMA system, that includes a base station (BS) 100 handling connections with four UEs 1, 2, 3, 4 that each uses downlink (i.e., base-to-UE or forward) and uplink (i.e., UE-to-base or reverse) channels. In the downlink, BS 100 transmits to each UE at a respective power level, and the signals transmitted by BS 100 are spread using orthogonal code words. In the uplink, UE 1-UE 4 transmit to BS 100 at respective power levels. Although not shown, BS 100 also communicates with a radio network controller (RNC), which in turn communicates with a public switched telephone network (PSTN).

The signals transmitted in the exemplary WCDMA system depicted in FIG. 1 can be formed as follows. An information data stream to be transmitted is first multiplied with a channelization code and then the result is multiplied with a scrambling code. The multiplications are usually carried out by exclusive-OR operations, and the information data stream and the scrambling code can have the same or different bit rates. Each information data stream or channel is allocated a unique channelization code, and multiple coded information signals simultaneously modulate a radio-frequency carrier signal. At a UE (or other receiver), the modulated carrier signal is processed to produce an estimate of the original information data stream intended for the receiver. This process is known as demodulation.

Good transmit power control methods are important for WCDMA (and other) communication systems having many transmitters that transmit simultaneously to minimize the mutual interference of such transmitters while assuring high system capacity. Depending upon the system characteristics, power control in such systems can be important for transmission in the uplink, the downlink, or both. To achieve reliable reception of a signal at each UE, the SIR of the received signal should exceed a prescribed threshold for each UE. For example, as shown in FIG. 1, consider the case in which the UEs receive, respectively, four signals on a common WCDMA communication channel. Each of the signals has a corresponding energy level associated with it, namely energy levels E1, E2, E3, and E4, respectively. Also present on the communication channel is a certain level of noise (N). For a given UE 1 to properly receive its intended signal, the ratio between E1 and the aggregate levels of E2, E3, E4, and N must be above the given UE's prescribed threshold SIR.

To improve the SIR of a received signal, the power of the transmitted signal may be increased, depending on the SIR measured at the receiver. Power, however, is an important resource in a WCDMA system. Since different channels are transmitting simultaneously at the same frequency, it is important to keep transmit power levels as low as possible while still maintaining an acceptable error rate to reduce the mutual interference between transmitters.

A UE accesses a base station using the random access procedure using a random access channel (RACH). A RACH is an uplink transport channel characterized by a collision risk and by being transmitted using open loop power control. The RACH procedure and channel is described in the $3^{rd}$ Generation Partnership project (3GPP) technical specifications 25.211 and 25.214. RACHs are always mapped one-to-one onto physical channels (PR-ACHs), i.e. there is no physical layer multiplexing of RACHs, and there can only be one RACH Transport Channel (TrCH) and no other TrCH in a RACH Composite Coded Transport Channel (CCTrCH). Service multiplexing is handled by the MAC layer.

Random access transmission is based on a slotted-ALOHA approach with fast acquisition indication combined with power ramping. The RACH transmission consists of two parts, namely preamble transmission and message part transmission. The preamble part is 4096 chips (roughly 1 ms) long (256 repetitions of a signature of length 16 chips) and fits into one access slot. The message part is 10 or 20 ms long and is used either for uplink signaling or for transfer of short user packets in the uplink direction. The RACH message part radio frame is split into 15 slots, each of length 2560 chips. Each slot consists of two parts, a data part to which the RACH transport channel is mapped and a control part that carries Layer 1 control information. The data and control parts are transmitted in parallel. A 10 ms message part includes one message part radio frame, while a 20 ms message part includes two consecutive 10 ms message part radio frames.

A UE accesses a base station using an available RACH by transmitting a series of access request preambles with increasing power levels, until the base station detects the access request. That is, the UE attempts to access the base station receiver by using a "power ramping" process that increases the power level of each successive transmitted preamble symbol, as shown in FIG. 2. Referring to FIG. 2, the UE transmits (and re-transmits) the access request preambles with increasing power levels until the base station acknowledges (ACK) that it has received the preamble or a denial of service reply (NACK) is received ("no reply" denotes no message transmitted). As soon as an access request preamble is detected, the base station activates a closed loop power control circuit, which functions to control the UE's transmitted power level in order to keep the received signal power from the UE at a desired level. The UE then transmits its specific access request data. In response, the base station starts the process of controlling the UE's transmitted power via a downlink channel. Once the initial "handshaking" between the UE and base station has been completed, the UE transmits a random access message.

A UE has to determine how much random access transmission power to use initially. Ideally, a UE should select a transmission power level so that an access request preamble is received at the base station with precisely the power needed for correct decoding of the random access message. However, for numerous reasons, it is virtually impossible to ensure that this will be the case. For example, the power of the received signal as required at the base station is not constant but can vary (e.g., due to variations in the radio channel characteristics and the speed of the UE). As such, these variations are to some extent unpredictable and thus unknown to the UE. Also, there can be significant errors due to the uplink path-loss. Path-loss is the signal attenuation occurring over the medium between transmission (TX) and reception (RX) due to several factors, such as distance, fading, interference, canceling multi-path reflections off buildings or other obstructions, and other factors.

Consequently, for the above-described reasons, there is a significant risk that a random access transmission will be received at the base station with too much power. This condition causes excessive interference for other users and thus reduces the capacity of the system. For the same reasons, there is also a risk that a random access transmission will be transmitted with too little power. This condition makes it impossible for the base station to detect and decode the transmission.

The setting of the initial power level is important for a number of reasons, including those discussed above and to avoid the time delay incurred due to the UE re-transmitting the preamble until the base station's acknowledgment message is received, as well as the amount of interference caused by the random access transmission. Currently, the calculation of initial power for sending preambles is based partly on broadcast information and partly on a UE measurement of received signal code power (RSCP). The uplink path-loss is not calculated independently. More particularly, the 3GPP random access procedure is based on the implicit assumption that downlink and uplink path-loss are equal, or their difference is negligible.

The problem with the conventional approach, however, is that there is a significant difference in uplink and downlink path-loss for UEs under a variety of circumstances, and this can be particularly devastating when a UE not moving or is moving very slowly. A need therefore exists for a method and apparatus for determining a difference in uplink and downlink path-loss for setting power levels in UEs, as well as for any other purpose.

SUMMARY

In one aspect, a method is described for estimating a path-loss difference between uplink and downlink communications at a first node communicating with a second node in a communication system. A quantity of access request preambles transmitted by the first node to the second node before an acknowledgement from the second node of successful receipt of a preamble is received at the first node, the preambles being transmitted at incrementally increasing power levels. A difference between an uplink path-loss attributed to communications from the first node to the second node and a downlink path-loss attributed to communications to the first node from the second node is estimated based on the transmitted preamble quantity determination. Once the path-loss difference is estimated, the estimate can be used for many purposes, such as to determine a transmission power of the first node.

In another aspect, an apparatus is described for determining a path-loss difference between uplink and downlink communications within a first node communicating with a second node in a communication system. The apparatus includes logic that determines a quantity of access request preambles transmitted by the first node to the second node before an acknowledgement from the second node of successful receipt of a preamble is received at the first node, the preambles being transmitted at incrementally increasing power levels, and logic that estimates a difference between an uplink path-loss attributed to communications from the first node to the second node and a downlink path-loss attributed to communications to the first node from the second node based on the transmitted preamble quantity determination.

In yet another aspect, an apparatus for determining a path-loss difference between uplink and downlink communications within a first node communicating with a second node in a communication system includes means for determining a quantity of access request preambles transmitted by the first node to the second node before an acknowledgement from the second node of successful receipt of a preamble is received at the first node, the preambles being transmitted at incrementally increasing power levels, and means for comparing the determining quantity of access request preambles to a reference. The apparatus also includes means for estimating a difference between an uplink path-loss attributed to communications from the first node to the second node and a downlink path-loss attributed to communications to the first node from the second node based on the comparison.

BRIEF DESCRIPTION OF THE DRAWINGS

Objects and advantages of the present invention will become apparent to those skilled in the art upon reading this description in conjunction with the accompanying drawings, in which.

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer readable medium for use by or in connection with an instruction execution system, apparatus, or device, such as a computer based system, processor containing system, or other system that can fetch the instructions from a medium and execute the instructions.

As used herein, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

Thus, the invention can be embodied in many different forms, and all such forms are contemplated to be within the scope of what is claimed. Any such form of embodiment can be referred to herein as "logic configured to" perform a described action, or alternatively as "logic that" performs a described action.

Figure 1:
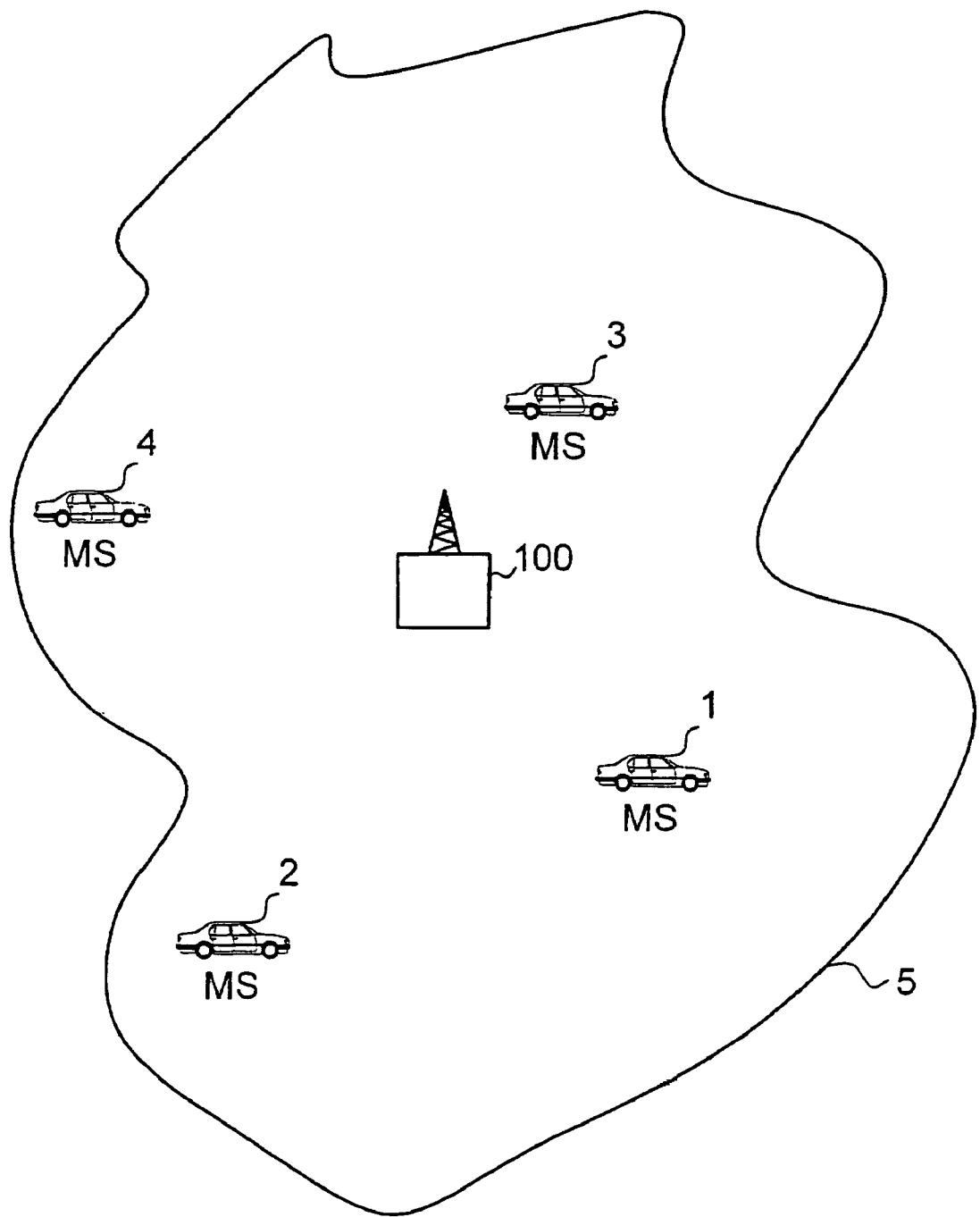
FIG. 1 is a block diagram illustrating a conventional communication system.
Figure 2:
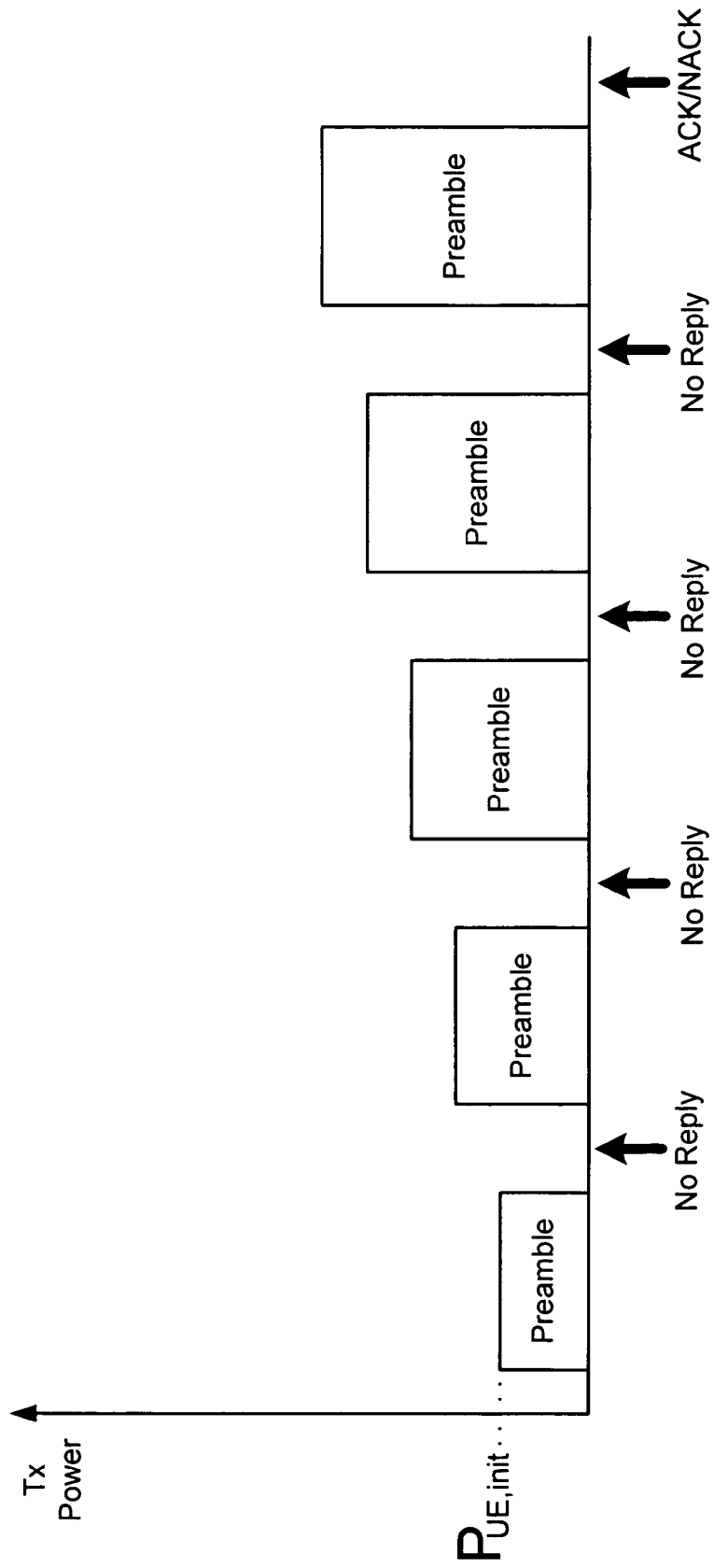
FIG. 2 is a block diagram illustrating access request preamble transmission.

Referring again to FIG. 2, during the RACH procedure, one or more preambles are sent. Each preamble consists of a connection establishment attempt, for which the UE can either receive an ACK, NACK, or no reply. If there is no reply, a new preamble is sent using a higher power level. This is repeated until a reply is received, or until a maximum number of preambles have been sent without a reply. If no reply is received, the cycle is deemed failed (known as "preamble failure"). The number of attempts and the step size are determined by the network and signaled, for example, on the broadcast channel (BCH). The initial power used for the first preamble is given in logarithmic form by Equation 1:

$$P_{UE,init} = L + I_{UL} + C_{PRACH} \quad (1)$$

where L is a path-loss estimate described below, $I_{UL}$ is an interference level signaled on the BCH, and $C_{PRACH}$ is a constant also signaled on the BCH and defined in logarithmic form as:

$$C_{PRACH} = SIR_{Target,RACH} - SF_{RACH} + C_{Backoff} \quad (2)$$

where $C_{backoff}$ is a trimming parameter, $SIR_{Target,RACH}$ is a target signal-to-interference ratio of the RACH, and $SF_{RACH}$ is the spreading factor.

The path-loss L should ideally be an estimate of the uplink (UL) path-loss, since the preambles are sent on the uplink. Conventional methods, however, have relied on the assumption that $L_{UL} \approx L_{DL}$, where $L_{DL}$ represents path-loss on the downlink, which is estimated in logarithmic form as:

$$L_{DL} = P_{CPICH} - RSCP_{CPICH} \quad (3)$$

where $P_{CPICH}$ is the transmitted power of the downlink common pilot channel (CPICH) and $RSCP_{CPICH}$ is the received signal code power of the common pilot channel at the UE.

The assumption that $L_{UL} \approx L_{DL}$ is used in the 3GPP standard. This assumption, however, leads to inaccurate estimation of uplink path-loss. Applicants have observed that there is, under certain circumstances, a significant difference between $L_{UL}$ and $L_{DL}$. For UEs that do not move, the path-loss difference $L_{UL} - L_{DL}$ can be relatively large for a long time. The reason is that uplink and downlink "fast fading" are uncorrelated.

Figure 3:
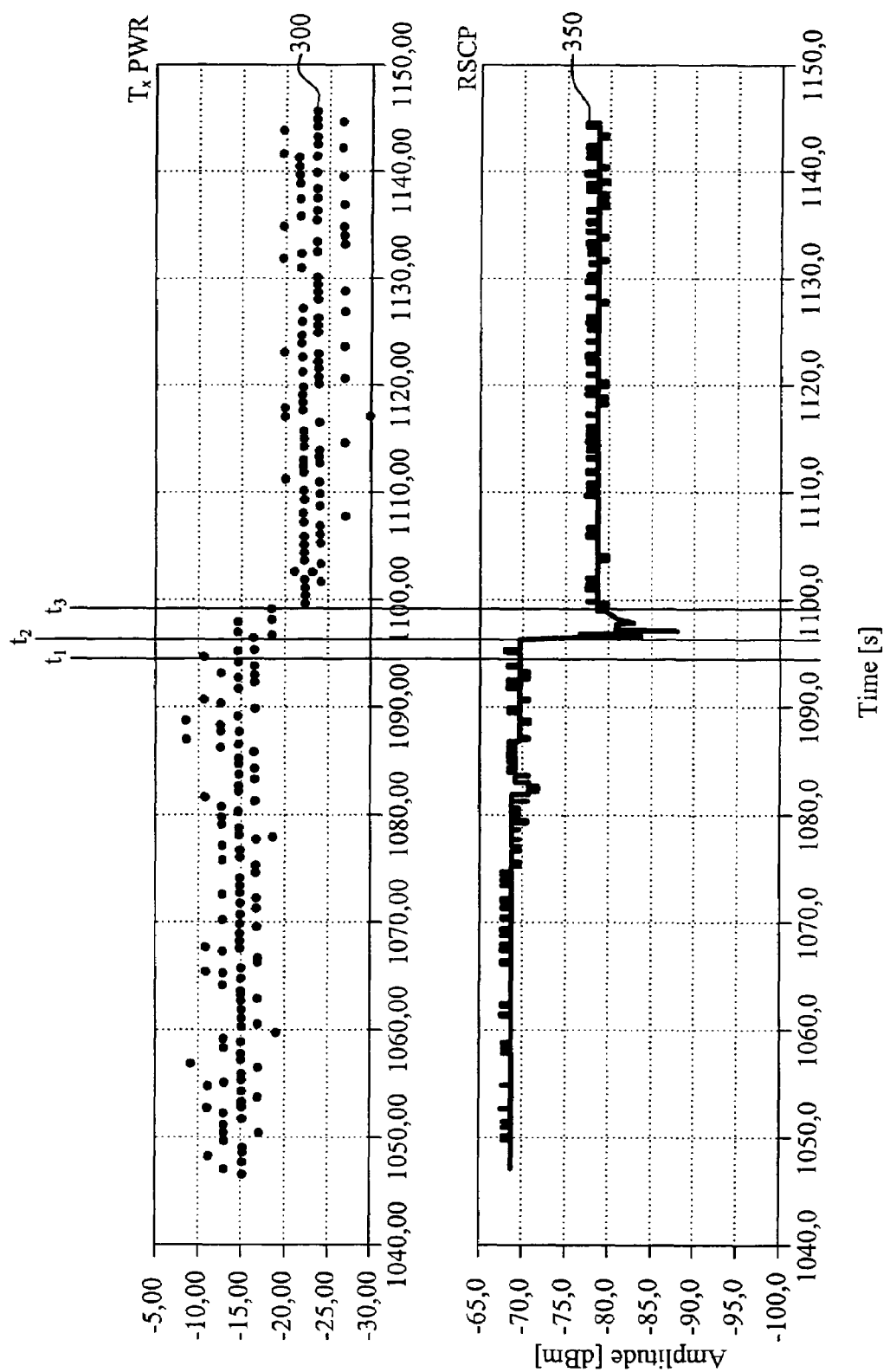
FIG. 3 is a graph illustrating how uplink and downlink path-loss can differ.

FIG. 3 illustrates how uplink and downlink path-loss can differ. To illustrate the problem, Applicants took measurements in a WCDMA system in which a UE was motionless for approximately 50 seconds at the start of the measurements, and then it was quickly moved approximately one meter to a new position, where it was then kept motionless for approximately another 50 seconds for the rest of the experiment. More particularly, tests were conducted to assess the correlation between uplink path-loss and downlink path-loss. RSCP 350 was used to measure downlink path-loss and transmit power 300 during a call was used as a measure uplink path-loss.

When the UE was moved at time $t_1$, the RSCP decreased 14 dB (indicating a 14 dB increase in downlink path-loss) and the transmit power decreased 2 dB (indicating a 2 dB decrease in uplink path-loss). Here, it is clear that the uplink and downlink path-loss are not always fully correlated, since if they were, the transmit power would instead have increased 14 dB to compensate for a 14 dB increase in uplink path-loss. Next, at time $t_2$, the RSCP increased 4 dB (indicating a 4 dB decrease in downlink path-loss), but the transmit power decreased 2 dB (indicating a 2 dB decrease in uplink path-loss). Finally, at time $t_3$, the RSCP has experienced an overall decrease of 10 dB (indicating a 10 dB increase in downlink path-loss), while the transmit power has experienced an overall decrease of 10 dB (indicating a 10 dB decrease in uplink path-loss).

In summary, the UE transmit power decreased after the move, indicating a decrease in uplink path-loss. At the same time, the received RSCP also decreased, indicating an increase in downlink path-loss. This illustrates that uplink and downlink path-loss can move in different directions, and be quite different. That is, there is sometimes bad correlation between uplink and downlink path-loss when a UE is kept relatively motionless, since fast fading is held essentially constant. When the UE is moving at high speed, the problem is less pronounced since fading will be averaged. Accordingly, there can be a difference between uplink and downlink path-loss at any given time.

By determining this path-loss difference, a more accurate initial power setting can be used, which improves preamble success statistics and leads to faster initialization times and initialization success rates. Alternatively, ignoring a large path-loss difference can result in a UE being repeatedly denied access to the network. The path-loss difference can be more than 10 dB, and can vary slowly in typical situations. For example, where the UE is motionless, e.g., being used as a modem with a portable computer, the path-loss difference can cause long periods of failed connection attempts, a problem that is quite noticeable.

Applicants describe methods and apparatus for determining this path-loss difference using information available to the UE. The RACH procedure, for example, can be used to obtain information about path-loss difference based on a quantity of successive connection attempts, i.e., preambles sent before receiving an acknowledgement. Such connection attempts occur quite frequently. Accordingly, the path-loss difference can be estimated and used to improve UE behavior and avoid connection problems.

Figure 4:
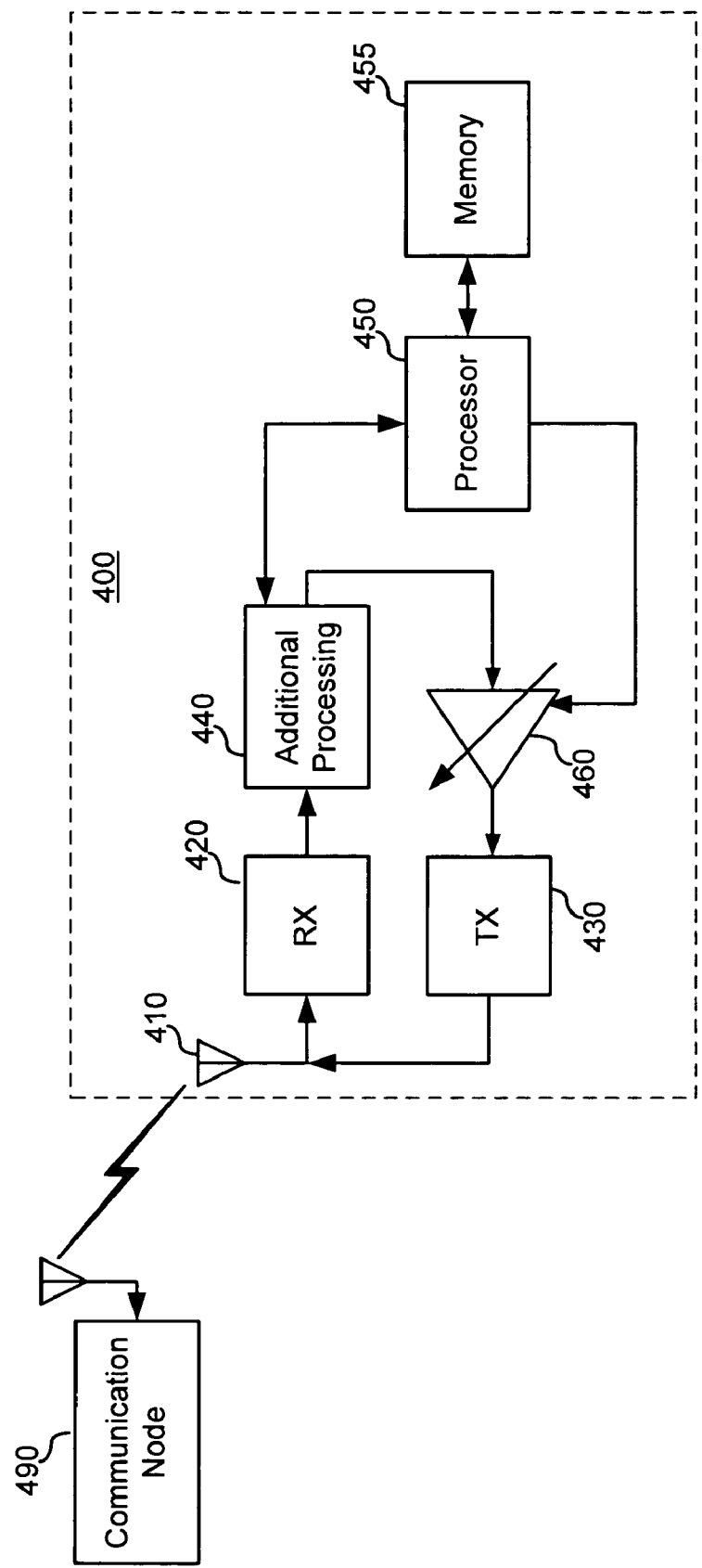
FIG. 4 is a block diagram illustrating an apparatus for determining a path-loss difference in a communication system.

An apparatus for determining a path-loss difference between uplink and downlink communications within a first node, such as a UE 400, communicating with a second node 490, such as a base station or other UE, in a communication system, is illustrated in FIG. 4. For the purposes of this description, the apparatus may include all or part of the components shown in FIG. 4 and may be considered to be within a UE 400, which can be a mobile phone, a personal digital assistant, a pager, a portable computer, or other communication device. However, it will be appreciated that a BS may contain similar components. As shown in FIG. 4, a UE 400 includes an antenna 410, receiver logic 420, transmitter logic 430, and additional processing logic 440 that operates, for example, to filter, amplify, demodulate, and decode a received signal, as well as to perform inverse operations on a signal for transmission. Detailed descriptions of such components and operations are known in the art, and are therefore omitted here. At least one processor 450 processes data from, provides data to, and controls the operation of the various components, including controlling an amplifier 460 to set a transmit power level.

The apparatus includes means for determining a quantity of access request preambles transmitted by the first node 400 to the second node 490 before the second node 490 acknowledges successful receipt of a preamble. With reference again to FIG. 2, according to the RACH procedure, one or more preambles are transmitted at incrementally increasing power levels. The preambles are processed in the additional processing 440 and forwarded to the amplifier 460 and transmitter 430 for transmission to the second node 490 of the communication system. Once the preamble power level is high enough for the second node 490 to receive and decode properly, the second node sends an acknowledgement ACK indicating to the UE 400 that the preamble was received, at which time the UE sends the RACH message containing the necessary RACH information. The processor 450 includes logic that determines how many preambles are sent before the second node 490 acknowledges successful receipt of a preamble. This value could be maintained, for example in a counter or register that is either part of the processor or accessible to the processor in a memory 455.

An initial power $P_{UE,init}$ is used for the first preamble of each series of preambles. As discussed above, this value is preferably as close as possible without exceeding the power level needed to reach the second node 490. Since this power level is affected by uplink path-loss, the more accurate a path-loss difference estimate is, the more efficient the RACH procedure becomes. Accordingly, the apparatus also includes means for comparing the determined quantity of access request preambles to a reference, such as one or more threshold values or a range. For example, when the quantity of access request preambles exceeds a number $N_{high}$, this is an indication that the transmit power level has been increased significantly over the initial transmit power level, which is an indication of a positive path-loss difference, e.g., the uplink path-loss has increased with respect to the downlink path-loss. When the quantity of access request preambles is less than a number $N_{low}$, this is an indication that the transmit power level has not increased significantly over the initial transmit power level, which can serve as an indication that the path-loss difference is negative, or insignificant.

In another aspect, the determined transmitted preamble quantity is compared to a quantity range. For example, when the quantity of access request preambles falls below or above an interval $N_{low}$-$N_{high}$, this is an indication of decrease or increase, respectively, of the path-loss difference.

In each aspect above, the processor 450 compares the preamble quantity to the one or more thresholds or ranges, which may be one or more values stored in a memory 455 associated with the processor 450, or may be received via parameter signaling received by the UE via the network. The thresholds may be fixed or may change dynamically as conditions require.

The apparatus also includes means for estimating a difference between an uplink path-loss attributed to communications from the first node to the second node and a downlink path-loss attributed to communications to the first node from the second node based on the comparison. For example, the processor 450 includes logic that estimates a path-loss difference based on exceeding one or more thresholds as described above. A path-loss difference value is preferably associated with each respective threshold. In one aspect, a lookup table is stored in a memory 455 associated with the processor 450. The lookup table is accessed by the processor 450 to locate the associated value. Other methods known in the art may also be used to maintain a corresponding value for the path-loss difference value. The retrieved path-loss difference value becomes the path-loss difference estimate.

For example, if a high threshold quantity of preambles is five, when five preambles are exceeded the path-loss difference can be estimated as 3 dB. Inversely, if a low threshold quantity of preambles is three, when less than three preambles result in acknowledgement; the path-loss difference can be estimated as −2 dB. Alternatively, both exemplary thresholds may be employed separately or to form a range of 3-5 preambles outside of which a path-loss difference is estimated and inside of which the path-loss difference is assumed to be insignificant.

In an exemplary embodiment, if a high threshold quantity of preambles is five, when five preambles are exceeded the error in the previous estimation of the path-loss difference is estimated as X dB, and the new path-loss difference is estimated as the previous estimation of the path-loss difference plus X. Inversely, if a low threshold quantity of preambles is three, when less than three preambles result in an ACK or NACK; the error in the previous estimation of the path-loss difference can be estimated as Y dB, where Y is a negative value, and the new path-loss difference is estimated as the previous estimation of the path-loss difference plus Y. For example, X=3 dB, Y=-2 dB. Alternatively, both exemplary thresholds may be employed separately or to form a range of 3-5 preambles outside of which a path-loss difference estimation is adjusted and inside of which the path-loss difference estimation is assumed to be correct. It will also be understood that more than two thresholds can be employed.

To improve robustness, the processor 450 can optionally maintain the path-loss difference estimates within an interval, such as [−z dB, w dB]. The choice of parameters can be made to optimize both preamble success rate and system load by reducing the risk of large uplink power dips and peaks. Typical values could be w=z=6 dB, although w and z need not be the same value. Moreover, as one of skill in this art can appreciate, additional filtering can also be used so that only recent and reliable information is used to estimate the path-loss difference. Since the problem with uplink and downlink path loss difference is mainly present for low speed, a Doppler estimator which estimates terminal speed can be used to turn off the algorithm at high speed.

Figure 5:
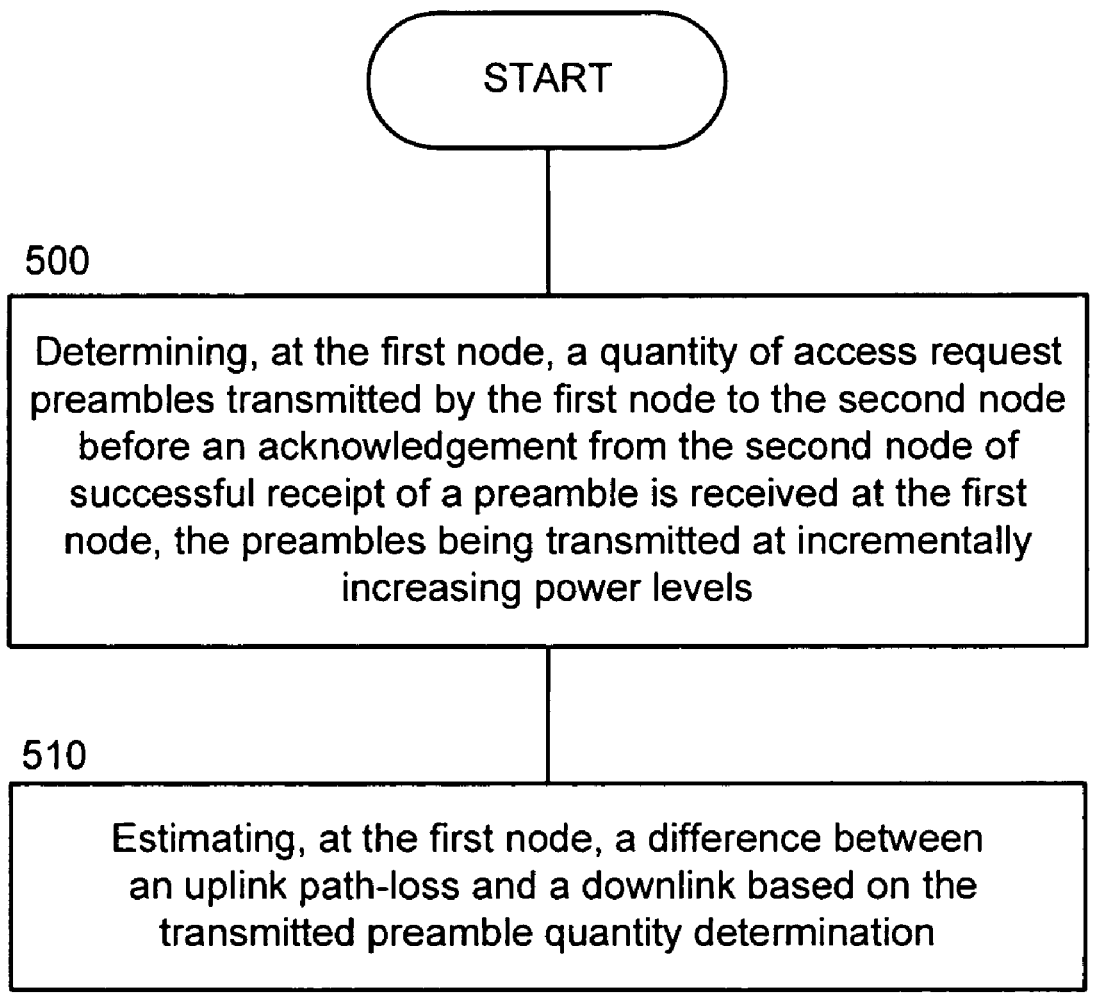
FIG. 5 is a flowchart illustrating a method for estimating a path-loss difference.

A method for estimating a path-loss difference between uplink and downlink communications at a first node communicating with a second node in a communication system is illustrated in FIG. 5. A quantity of access request preambles transmitted by the first node to the second node before an acknowledgement from the second node of successful receipt of a preamble is received at the first node (500). The preambles are transmitted at incrementally increasing power levels, as described above. A difference between an uplink path-loss attributed to communications from the first node to the second node and a downlink path-loss attributed to communications to the first node from the second node is estimated at the first node based on the transmitted preamble quantity determination (510).

Once the path-loss difference is estimated, the estimate can be used for many purposes, as can be appreciated by one skilled in the art. For example, the path-loss difference estimate can be used to determine a transmission power of the UE. The determined transmission power level can be used, for example, as a power level for an initial one of a next quantity of access request preambles, i.e., $P_{UE,init}$. Accordingly, the apparatus can include means for determining a power transmission level based on the estimated path-loss difference. For example, the processor 450 controls the amplifier 460 to adjust the transmit power up or down to compensate for the estimated path-loss difference.

Figure 6:
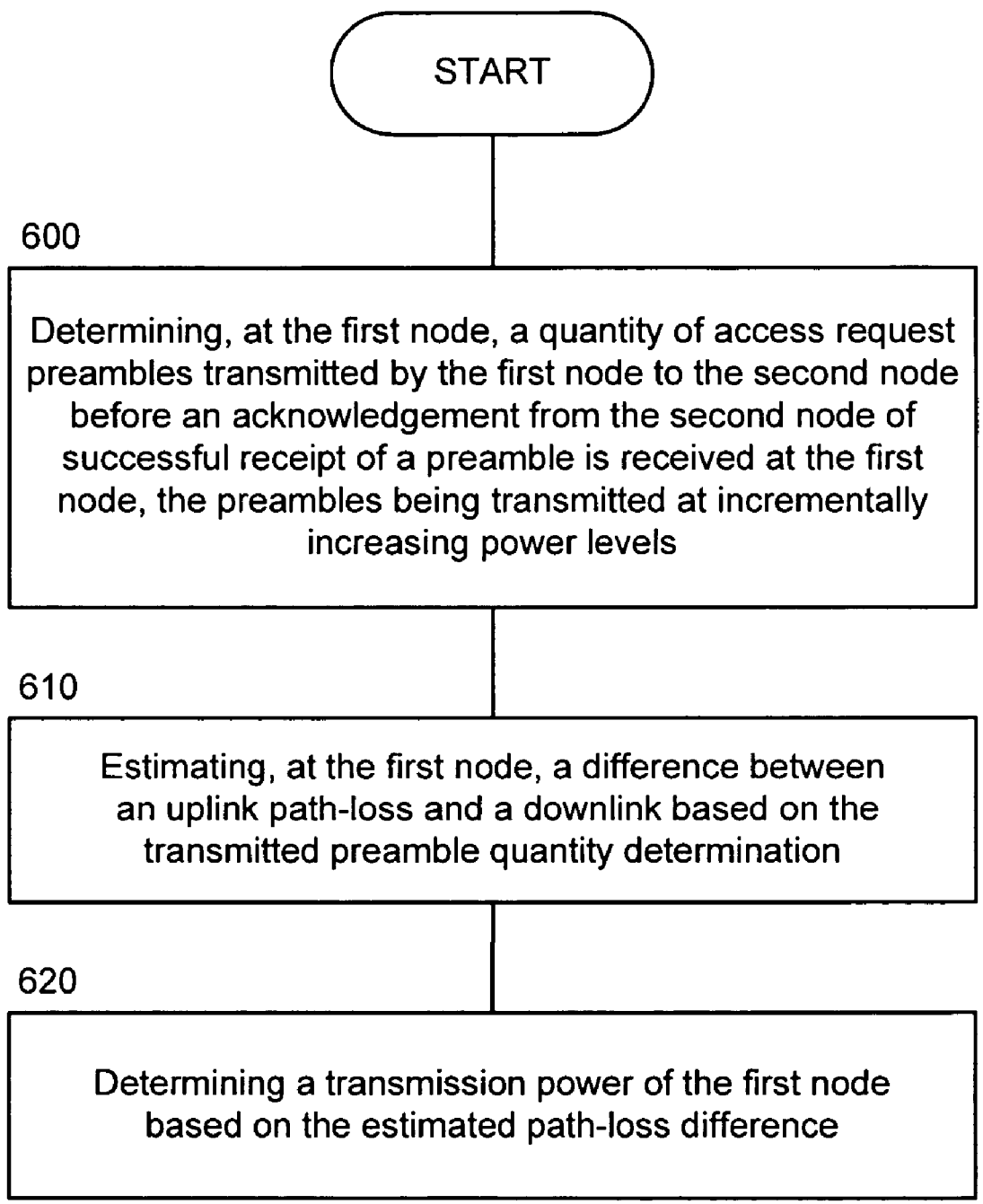
FIG. 6 is a flowchart illustrating a method for estimating a path-loss difference for use in determining a transmission power.

A method for estimating a path-loss difference for use in determining a transmission power is illustrated in FIG. 6. A quantity of access request preambles transmitted by the first node to the second node before an acknowledgement from the second node of successful receipt of a preamble is received at the first node (600). The preambles are transmitted at incrementally increasing power levels, as described above. A difference between an uplink path-loss attributed to communications from the first node to the second node and a downlink path-loss attributed to communications to the first node from the second node is estimated at the first node based on the transmitted preamble quantity determination (610). A transmission power of the first node is determined based on the estimated path-loss difference (620).

As discussed above, current systems base path-loss calculations on received signal strength, such as RSCP on the CPICH in a WCDMA system, and assume that the path-loss difference is negligible. Put another way, prior approaches use received signal strength to estimate downlink path-loss and assume that the uplink path-loss is the same, when determining a power transmission level. This, however, is not the case, as illustrated by FIG. 3.

According to another aspect, in order to more easily adapt Applicant's methods and apparatus for use in determining a power transmission level in systems that currently use received signal strength, the received signal strength is adjusted according to the path-loss difference prior to processing the received signal strength to determine a power transmission level. This results in a more accurate power transmission level while minimizing changes to the current infrastructure in place. For example, this technique can be implemented in a 3GPP system without violating 3GPP specifications on UE RSCP estimation.

Using the WCDMA example, the $RSCP_{CPICH}$ used for power transmission level determinations according to this aspect is adjusted to $RSCP_{CPICH}+\Delta L$. Accordingly, in this aspect, the apparatus includes means for estimating received signal strength. For example, the processor 450 estimates a received signal strength based on signals received from the communication node 490 via the antenna 410, receiver 420, and additional processing 440. The processor 450 also estimates the path-loss difference using any of the techniques described above.

The apparatus further includes means for setting the power transmission level based on the estimated path-loss difference and the estimated received signal strength. For example, the processor 450 combines the received signal strength and path-loss difference estimates and controls the amplifier 460 to adjust the transmission power level. The combining can involve simply adjusting the estimated received signal strength according to the path-loss difference estimation, summing the estimations, or any combination method, e.g., using weighting, as will be appreciated by one skilled in this art.

Figure 7:
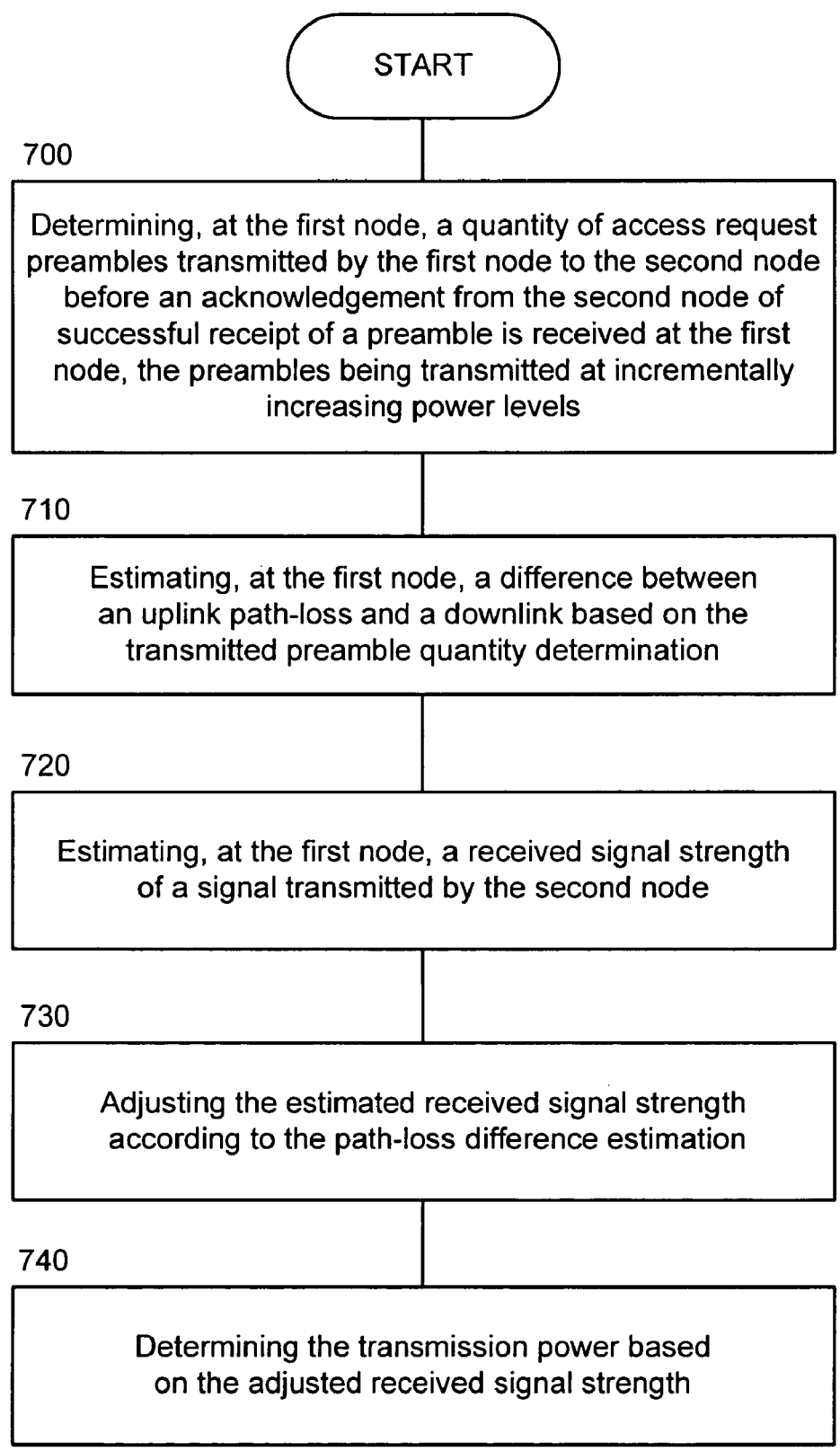
FIG. 7 is a flowchart illustrating a method for estimating a path-loss difference for use with estimated received signal strength in determining a transmission power.

A method for estimating a path-loss difference for use with estimated received signal strength in determining a transmission power is illustrated in FIG. 7. A quantity of access request preambles transmitted by the first node to the second node before an acknowledgement from the second node of successful receipt of a preamble is received at the first node (700). The preambles are transmitted at incrementally increasing power levels, as described above. A difference between an uplink path-loss attributed to communications from the first node to the second node and a downlink path-loss attributed to communications to the first node from the second node is estimated at the first node based on the transmitted preamble quantity determination (710). A received signal strength of a signal transmitted by the second node is estimated at the first node (720). The estimated received signal strength is adjusted according to the path-loss difference estimation (730). The transmission power is determined based on the adjusted received signal strength (740).

An additional advantage using the described techniques is in the reduction in the impact of the variation of transmit power resulting from temperature change, battery voltage change, and frequency change. These variations can be quite large by design. For example variations of up to ±12 dB are permitted in the 3GPP specifications. Since these variables vary slowly, their impact on RACH performance success rate will be reduced. Put another way, part of the transmitter losses due to these factors is compensated since the losses appear as path-loss differences.

It will be appreciated by those of ordinary skill in the art that the invention can be embodied in various specific forms without departing from its essential characteristics. The disclosed embodiments are considered in all respects to be illustrative and not restrictive. The scope of the invention is indicated by the appended claims, rather than the foregoing description, and all changes that come within the meaning and range of equivalents thereof are intended to be embraced thereby.

It should be emphasized that the terms "comprises", "comprising", "includes", and "including", when used in this description and claims, are taken to specify the presence of stated features, steps, or components, but the use of these terms does not preclude the presence or addition of one or more other features, steps, components, or groups thereof.

What is claimed is:

1. A method for estimating a path-loss difference between uplink and downlink communications at a first node communicating with a second node in a communication system, comprising:
    determining, at the first node, a quantity of access request preambles transmitted by the first node to the second node before an acknowledgement from the second node of successful receipt of a preamble is received at the first node, the preambles being transmitted at incrementally increasing power levels;
    estimating, at the first node, a difference between an uplink path-loss attributed to communications from the first node to the second node and a downlink path-loss attributed to communications to the first node from the second node based on the transmitted preamble quantity determination.

2. The method of claim 1, comprising:
    determining a transmission power of the first node based on the estimated path-loss difference.

3. The method of claim 1, wherein estimating the path-loss difference comprises:
    comparing the transmitted preamble quantity determination to a threshold value; and
    estimating the path-loss difference based on the comparison.

4. The method of claim 1, wherein estimating the path-loss difference comprises:
    comparing the transmitted preamble quantity determination to a quantity range; and
    estimating the path-loss difference based on the comparison.

5. The method of claim 4, wherein estimating the path-loss difference based on the comparison comprises:
    increasing the path-loss estimate when the transmitted preamble quantity is above the quantity range; and
    decreasing the path-loss estimate when the transmitted preamble quantity is below the quantity range.

6. The method of claim 1, wherein estimating the path-loss difference comprises:
    comparing the transmitted preamble quantity determination to a threshold value; and
    adjusting a previous path-loss difference estimation based on the comparison.

7. The method of claim 1, wherein estimating the path-loss difference comprises:
    comparing the transmitted preamble quantity determination to a quantity range; and
    adjusting a previous path-loss difference estimation based on the comparison.

8. The method of claim 1, wherein estimating the path-loss difference comprises:
    limiting the path-loss difference determination to within a range of allowable values.

9. The method of claim 2, wherein determining a transmission power of the first node comprises:
    estimating, at the first node, a received signal strength of a signal transmitted by the second node;
    adjusting the estimated received signal strength according to the path-loss difference estimation; and
    determining the transmission power based on the adjusted received signal strength.

10. The method of claim 9, wherein the received signal strength is based on a received signal code power (RSCP).

11. The method of claim 1, wherein the access request preambles are part of a random access channel (RACH) procedure.

12. The method of claim 1, wherein the first node is part of at least one of a mobile phone, a personal digital assistant, a pager, a portable computer, and a modem card in a machine to machine application.

13. The method of claim 2, wherein the determined transmission power level is used as a power level for an initial one of a next quantity of access request preambles.

14. The method of claim 3, wherein the threshold value is provided to the first node via the communication system.

15. The method of claim 6, wherein the threshold value is provided to the first node via the communication system.

16. The method of claim 3, wherein the threshold value changes dynamically.

17. The method of claim 6, wherein the threshold value changes dynamically.

18. An apparatus for determining a path-loss difference between uplink and downlink communications within a first node communicating with a second node in a communication system, the apparatus comprising:
    logic that determines a quantity of access request preambles transmitted by the first node to the second node before an acknowledgment from the second node of successful receipt of a preamble is received at the first node, the preambles being transmitted at incrementally increasing power levels;
    logic that estimates a difference between an uplink path-loss attributed to communications from the first node to the second node and a downlink path-loss attributed to communications to the first node from the second node based on the transmitted preamble quantity determination.

19. The apparatus of claim 18, comprising:
    logic that determines a transmission power of the first node based on the estimated path-loss difference.

20. The apparatus of claim 18, comprising:
    logic that compares the transmitted preamble quantity determination to a threshold value; and
    logic that estimates the path-loss difference based on the comparison.

21. The apparatus of claim 18, comprising:
    logic that compares the transmitted preamble quantity determination to a quantity range; and
    logic that estimates the path-loss difference based on the comparison.

22. The apparatus of claim 21, comprising:
    logic that increases the path-loss estimate when the transmitted preamble quantity is above the quantity range; and
    logic that decreases the path-loss estimate when the transmitted preamble quantity is below the quantity range.

23. The apparatus of claim 21, comprising:
    logic that compares the transmitted preamble quantity determination to a threshold value; and
    logic that adjusts a previous path-loss difference estimation based on the comparison.

24. The apparatus of claim 21, comprising:
logic that compares the transmitted preamble quantity determination to a quantity range; and
logic that adjusts a previous path-loss difference estimation based on the comparison.

25. The apparatus of claim 18, comprising:
logic that limits the path-loss difference determination to within a range of allowable values.

26. The apparatus of claim 19, comprising:
logic that estimates, at the first node, a received signal strength of a signal transmitted by the second node;
logic that adjusts the estimated received signal strength according to the path-loss difference estimation; and
logic that determines the transmission power based on the adjusted received signal strength.

27. The apparatus of claim 26, wherein the received signal strength is based on a received signal code power (RSCP).

28. The apparatus of claim 18, wherein the access request preambles are part of a random access channel (RACH) procedure.

29. The apparatus of claim 18, wherein the first node is part of at least one of a mobile phone, a personal digital assistant, a pager, a portable computer, and a modem card in a machine to machine application.

30. The apparatus of claim 19, wherein the determined transmission power level is used as a power level for an initial one of a next quantity of access request preambles.

31. The apparatus of claim 20, wherein the threshold value is provided to the first node via the communication system.

32. The apparatus of claim 23, wherein the threshold value is provided to the first node via the communication system.

33. The apparatus of claim 20, wherein the threshold value changes dynamically.

34. The apparatus of claim 23, wherein the threshold value changes dynamically.

35. An apparatus for determining a path-loss difference between uplink and downlink communications within a first node communicating with a second node in a communication system, the apparatus comprising:
means for determining a quantity of access request preambles transmitted by the first node to the second node before an acknowledgement from the second node of successful receipt of a preamble is received at the first node, the preambles being transmitted at incrementally increasing power levels;
means for comparing the determining quantity of access request preambles to a reference; and
means for estimating a difference between an uplink path-loss attributed to communications from the first node to the second node and a downlink path-loss attributed to communications to the first node from the second node based on the comparison.

36. The apparatus of claim 35, comprising:
means for setting a power transmission level based on the estimated path-loss difference.

37. The apparatus of claim 36, wherein the means for setting a power transmission level comprises:
means for estimating a received signal strength; and
means for setting the power transmission level based on the estimated path-loss difference and the estimated received signal strength.

38. The apparatus of claim 35, wherein the apparatus is part of at least one of a mobile phone, a personal digital assistant, a pager, and a portable computer.

39. A computer-readable medium containing a computer program for estimating a path-loss difference between uplink and downlink communications at a first node communicating with a second node in a communication system, wherein the computer program performs the steps of:
determining, at the first node, a quantity of access request preambles transmitted by the first node to the second node before an acknowledgement from the second node of successful receipt of a preamble is received at the first node, the preambles being transmitted at incrementally increasing power levels;
estimating, at the first node, a difference between an uplink path-loss attributed to communications from the first node to the second node and a downlink path-loss attributed to communications to the first node from the second node based on the transmitted preamble quantity determination.

40. The computer-readable medium of claim 39, wherein to estimate the path-loss difference, the computer program performs the steps of:
comparing the transmitted preamble quantity determination to a quantity range; and
adjusting a previous path-loss difference estimation based on the comparison.

* * * * *